(12) United States Patent
Massey et al.

(10) Patent No.: US 8,877,270 B2
(45) Date of Patent: Nov. 4, 2014

(54) BEVERAGE CARTRIDGE

(75) Inventors: Tulay Massey, Banbury (GB); Ian Denis Fisk, Loughborough (GB); Sian Henson, Coventry (GB)

(73) Assignee: Kraft Foods R&D, Inc., Deerfield, IL (US)

( * ) Notice: Subject to any disclaimer, the term of this patent is extended or adjusted under 35 U.S.C. 154(b) by 144 days.

(21) Appl. No.: 13/701,480

(22) PCT Filed: Jun. 1, 2011

(86) PCT No.: PCT/GB2011/000837
§ 371 (c)(1),
(2), (4) Date: Feb. 19, 2013

(87) PCT Pub. No.: WO2011/151626
PCT Pub. Date: Dec. 8, 2011

(65) Prior Publication Data
US 2013/0142915 A1 Jun. 6, 2013

(30) Foreign Application Priority Data
Jun. 1, 2010 (GB) .................................. 1009181.7

(51) Int. Cl.
*B65B 29/02* (2006.01)
*A23L 1/40* (2006.01)
(Continued)

(52) U.S. Cl.
CPC ............... *B65D 85/8043* (2013.01); *A23L 1/40* (2013.01); *A23F 5/40* (2013.01); *A23L 1/0029* (2013.01); *A23L 1/0014* (2013.01); *A23L 1/0052* (2013.01); *A23L 2/395* (2013.01); *A23L 1/0047* (2013.01); *A23G 1/56* (2013.01); *A23V 2002/00* (2013.01); *A23F 5/14* (2013.01)

USPC ............ 426/77; 426/115; 426/305; 426/431; 99/295

(58) Field of Classification Search
CPC ........................... B65D 85/8043; B65D 82/804
USPC ........................ 426/77, 115, 305, 431; 99/295
See application file for complete search history.

(56) References Cited

U.S. PATENT DOCUMENTS

2002/0078831 A1    6/2002    Cai

FOREIGN PATENT DOCUMENTS

| EP | 1440903 A1 | 7/2004 |
| EP | 1994831 A1 | 11/2008 |

(Continued)

OTHER PUBLICATIONS

English translation of State Intellectual Property Office of the People's Republic of China Notification of the First Office Action dated May 5, 2014 for Application No. 201180026832.5 (19 pgs.).

(Continued)

*Primary Examiner* — Rena L Dye
*Assistant Examiner* — Chaim Smith
(74) *Attorney, Agent, or Firm* — Fitch, Even, Tabin & Flannery LLP (57) ABSTRACT

The present invention relates to a beverage cartridge for use in a beverage preparation machine, the cartridge being formed from substantially water-impermeable materials and comprising an inlet for the introduction of an aqueous medium into the cartridge and an outlet for discharge of a beverage produced from the aqueous medium and one or more beverage ingredients contained in the cartridge, wherein the one or more beverage ingredients includes one or more discrete edible components which are substantially insoluble in the aqueous medium and which, in use, are dispensed from the cartridge with the beverage.

14 Claims, 4 Drawing Sheets

(51) Int. Cl.
*A23F 5/40* (2006.01)
*A23L 1/00* (2006.01)
*B65D 85/804* (2006.01)
*A23L 2/395* (2006.01)
*A23G 1/56* (2006.01)
*A23F 5/14* (2006.01)

(56) References Cited

FOREIGN PATENT DOCUMENTS

| | | | |
|---|---|---|---|
| EP | 1326500 | B1 | 2/2009 |
| NL | 2000094 | C2 | 12/2007 |
| WO | 2003059778 | A2 | 7/2003 |
| WO | 2004077964 | A1 | 9/2004 |
| WO | 2004087529 | A1 | 10/2004 |
| WO | 2005079639 | A2 | 9/2005 |
| WO | 2006030461 | A1 | 3/2006 |
| WO | 2007009600 | A1 | 1/2007 |
| WO | 2008148601 | A1 | 12/2008 |
| WO | 2011/063322 | A1 | 5/2011 |

OTHER PUBLICATIONS

International search report mailed Dec. 13, 2011, for International Application No. PCT/US2011/000837.
Combined Search and Examination Report dated Oct. 11, 2010, from U.K. Patent Appl. GB1009181.7 (6 pages).
Examination Report dated Jul. 27, 2012, from U.K. Patent Appl. GB1009181.7 (3 pages).
Examination Report dated Nov. 27, 2012, from U.K. Patent Appl. GB1009181.7 (2 pages).
Applicant's Response dated May 29, 2012, to the Combined Search and Examination Report of Oct. 11, 2010 (5 pages).
Applicant's Response dated Sep. 27, 2012, to the Examination Report of Jul. 27, 2012 (13 pages).
Applicant's Response dated Jan. 25, 2013, to the Examination Report of Nov. 27, 2012 (13 pages).

BEVERAGE CARTRIDGE

CROSS REFERENCE TO RELATED APPLICATIONS

This application is a U.S. national phase application of International Application No. PCT/GB2011/000837, filed Jun. 1, 2011, designating the United States, which claims benefit from United Kingdom Application No. 1009181.7, filed Jun. 1, 2010, both of which are hereby incorporated herein by reference in their entirety.

FIELD

The present invention relates to a beverage cartridge for use in a beverage preparation machine and, in particular, to a cartridge comprising ingredients for forming a beverage including discrete edible components. These components augment the final beverage by providing a novel texture and mouthfeel to the beverage.

BACKGROUND

It is known to include edible components in a beverage. For example, marshmallows are commonly added to hot chocolate when it is purchased in a café or restaurant. The marshmallows provide a further dimension of taste and mouthfeel to the beverage. In order to have the café-style drink at home, it is known to provide home-beverage kits comprising a dual sachet wherein the first sachet contains a beverage composition for forming a beverage and a second sachet includes an amount of marshmallows to be scattered over the beverage.

Beverage cartridges are well known in the art. Many modern domestic beverage machines dispense individual servings of a beverage directly into a drinking receptacle, and derive the beverage from a bulk supply of beverage ingredients or from individual packages of beverage ingredients such as pods, pads or cartridges. In the following specification such packages will be referenced by the general term cartridges. Machines which use such cartridges reduce the need for cleaning and can enable the user to make a selection of beverages such as coffee, tea, hot chocolate and the like. An example of one type of cartridge is described in EP-A-1440903. The beverages are formed from brewing, mixing, dissolving or suspending the beverage ingredients in a hot or cold aqueous medium. For example, for coffee beverages, heated water is forced through the cartridges under pressure to extract the aromatic constituents from the compacted coffee grounds contained therein. Where the coffee beverages are formed from roast and ground coffee, such as in WO20051079639, the roast and ground coffee is retained in the cartridge and does not itself form part of the final beverage.

The beverage composition material used as ingredients in these on-demand beverage cartridges are typically particulates or agglomerated powders to increase their solubility and/or extractability. Other beverage compositions might include ingredients in the form of a liquid medium, in which case the cartridge ingredients need to satisfy strict requirements due to processing demands. For example, the ingredients are desirably stable during in-packaging pasteurisation. Furthermore, their use in a cartridge mandates an extended shelf life.

There is, therefore, a desire for an on-demand beverage containing an additive capable of providing a further dimension of taste and mouthfeel to a beverage. However, known beverage additives are not suitable for use in a cartridge for a number of reasons. In particular, in order to be discernable within the beverage, the additives need to be of sufficient size. However, a marshmallow, for example, is too large to be dispensed through a conventional cartridge outlet. Cartridge outlets are typically small in order to provide an internal pressure to the cartridge to aid the dissolution or extraction of solid ingredients. Other problems include the unsuitability of these additives for the long term storage of cartridges, particularly in the presence of a moisture containing environment, such as when a liquid beverage component is included in the same cartridge. There is therefore a need for a shelf-stable and preferably heat-stable component that can imbue additional properties in specialty products including Lattes, cappuccinos or hot chocolate beverages.

EP1326500 describes an encapsulated food product comprising a gelatine-free hydrocolloid casing surrounding a liquid, soft or particulate centre. The primary food product contemplated in EP1326500 is a champagne flavoured fizzy sweet. EP1326500 does not disclose ingredients for dispensing from a beverage cartridge.

Therefore, while it is known to provide encased ingredients in food-stuffs, for example, to form sweets, where an outer layer can enhance shelf-life or to provide controlled release of flavours, the use of further layers has not been applied to tackling the above problems in respect of beverage additives.

There is therefore a desire for an improved cartridge for use in preparing a beverage, or at least a cartridge that will mitigate some of the problems associated with the prior art or provide a useful alternative thereto.

SUMMARY

According to a first aspect, the present invention provides a beverage cartridge for use in a beverage preparation machine, the cartridge being formed from substantially water-impermeable materials and comprising an inlet for the introduction of an aqueous medium into the cartridge and an outlet for discharge of a beverage produced from the aqueous medium and one or more beverage ingredients contained in the cartridge, wherein the one or more beverage ingredients includes one or more discrete edible components which are substantially insoluble in the aqueous medium and which, in use, are dispensed from the cartridge with the beverage.

Following extensive studies, the present inventors have discovered that it is possible to provide a beverage cartridge having discrete edible components therein for dispensing into a beverage. The components are substantially insoluble in the aqueous medium that forms the beverage. Other beverage ingredients which are soluble or extractable in the aqueous medium and known for use in conventional beverage cartridges may also be included in the cartridge with the one or more discrete edible components.

That is, the present inventors have discovered that it is possible to provide a beverage cartridge having discrete edible components therein, optionally stored in an aqueous environment, that are dispensed from the cartridge when the beverage is formed. Advantageously, the discrete edible components can form part of the final beverage in the same form as it had when stored in the beverage cartridge. Alternatively, the discrete edible components can adopt an expanded water-absorbed form once expelled from the cartridge.

In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

"Chewy Components"

The inventors have found that a primary obstacle preventing the inclusion of edible components as accompaniments in a beverage dispensed from a beverage dispensing machine is that the components have difficulty in passing through small apertures in the cartridge. One solution found by the present inventors is to provide deformable, or "chewy", components that they retain their structure despite deformation when leaving the cartridge. This has been found to be especially advantageous since the deformable characteristics of the chewy components may allow them to pass through smaller apertures than expected during beverage preparation.

Therefore, in one embodiment the edible components are deformable so as to pass through the outlet. This allows for the size of the component to be maximised while still ensuring that sufficient pressure is retained in the capsule to prepare the desired beverage (for example, by fully dissolving, diluting or extracting the beverage ingredients).

In one embodiment, the hydration of the chewy components during preparation of the beverage by the addition of an aqueous medium causes a increase in the component size. The component may be selected so that it will be dispensed from the cartridge before it has swollen to a size greater than the dispensing aperture. It is, however, preferred that the chewy components do not require hydration (are substantially or completely non-hydratable) since this allows for better quality control and the provision of a more uniform component and, hence, improved customer satisfaction.

"Crunch Components"

It is desirable to include a crunchy component in a beverage since this would provide a unique mouthfeel to a beverage. Since crunchy beverage components are substantially non-deformable, the components could have difficulty in passing through small apertures in the cartridge without damage. A further problem is that crunchy components may have a greater density than the aqueous medium used to form the beverage. This can lead the components to sink to the bottom of the beverage where they will not be imbibed.

The present inventors have found that they can provide a deformable, or "chewy", outer layers on a crunchy component. This allows a comparatively, larger crunchy component to be employed because it will not be crushed or damaged during dispensing of the beverage. Rather, the chewy layer deforms and protects the crunchy core. Furthermore, the application of a different density outer layer allows selective reduction/increase in the density of the additive with respect to the aqueous medium. This allows the component to be tailored, if desired, to float on the surface of, sink, or hang suspended in the beverage.

"Multi-Layer Coatings"

The present inventors have discovered a novel method of coating beverage additive components. The inventors have also produced novel beverage components by providing chewy or crunchy pieces with one or more coating layers. The components which are preferably for use in a beverage cartridge, may have a central core provided with one or more layers. The coating layer or layers used in the components may act in one of a number of roles:

to provide a chewy or deformable coating on the outside of a non-chewy or deformable component;
to enhance storage stability of ingredients, for example by reducing moisture ingress or oxygen permeation;
to entrap specific flavour compounds resulting in their controlled release during the preparation of the beverage; and
to provide temporal release of layers so that the beverage may be provided with a layered appearance.

Accordingly, by virtue of the three above-identified techniques and combinations thereof, the present inventors have managed to provide a cartridge having novel components therein, so that an on-demand beverage can be produced having unique mouthfeel and taste properties.

The term "insoluble" as used herein means that the component does not dissolve in water. Preferably the components are substantially insoluble, so that they do not dissolve in a moist environment, under storage conditions (refrigerated) and preferably not even under ambient conditions (20° C.) within a period of at least week, more preferably 1 month, and most preferably at least one year. Thus, in a preferred embodiment the discrete edible components are provided in a cartridge stored in an aqueous environment (such as in a liquid milk ingredient). By dissolve, it is meant complete dissolution into the moist conditions. More preferably the component does not exhibit more than slight degradation under these conditions. Most preferably, the component is impervious to moist conditions.

The edible components are preferably substantially insoluble under beverage preparation conditions. That is, when contacted with a hot (or cold) aqueous medium within the cartridge, the component does not substantially dissolve. As described below, where the component is not stored in an aqueous environment, the component may be provided with an outer soluble coating which may be dissolved on contact with the hot (or cold) aqueous medium, but at least the underlying body, or core, is preferably substantially insoluble. As regards the components in the finished beverage, it is preferred that the soluble portion of the component does not fully dissolve for at least one minute after the beverage is dispensed, more preferably for at least 5 minutes. The insoluble portion of the component preferably does not substantially dissolve while the beverage remains at a suitable drinking temperature. Preferably the component does not dissolve.

The following terms would be understood by a person skilled in the art. In particular, the terms have well defined meanings in the art.

The term "deformable" as used herein means that the component is ductile/pliant when subjected to a sheer force. That is, there is plastic and/or elastic deformation of the component when it is subjected to a compressive or expansive force. The term "chewy" is considered synonymous with the term "deformable".

The term "non-deformable" as used herein means that the component is brittle and/or snaps when subjected to a sheer force. That is, there is substantially no, or very limited plastic and/or elastic deformation of the component when it is subjected to a compressive or expansive force. The term "crunchy" is considered synonymous with the term "non-deformable".

The term "discrete" as used herein means that the components are separate and distinct or "individual". That is they can be perceived individually and not as connected to, or part of something else and, in particular, not as an agglomeration of several components.

It will be understood that by the term "cartridge" as used herein is meant any capsule, pod, container, or receptacle which contains one or more beverage ingredients in the manner described, having an inlet and a separate outlet formed in the cartridge. The cartridge may be rigid, semi-rigid or flexible. The substantially water impermeable materials that may be used are conventional and well known in the art. It should be understood that the material need not be completely water impermeable, since very small amounts of water, given sufficient time, could diffuse through some cartridge materials. Preferably the material is also substantially air impermeable. The materials used are preferably at least completely water impermeable and preferably completely air and water impermeable.

The cartridge is preferably sealed before use. When unsealed, the cartridge preferably defines a flowpath for an aqueous medium. The flowpath starts at the inlet and passes through or adjacent to the beverage ingredients (including the components claimed) and ends at the outlet, whereupon the aqueous medium is dispensed into a receptacle. The cartridge preferably does not have any obstructions to hinder dispensing the beverage, such as a filter or mesh.

The aqueous medium is preferably water, although a preprepared beverage, such as hot chocolate could be used. The medium may be chilled or at room temperature, but is preferably hot when introduced to the cartridge. Preferably the medium is at from 25 to 99° C., more preferably from 65 to 95° C. and most preferably at 80 to 90° C.

The deformable edible components may comprise a restructured fruit piece, a soft candy, a fruit pastille or a flavoured nugget. Where a flavoured nugget is used, this preferably comprises a hydrocolloid and a flavoured ingredient. In this way, a component may be tailored to the precise requirements of size, taste and firmness. The hydrocolloid is preferably selected from gelatine, carrageenan, alginate, agarose, gellan gum, pectin, a cellulose derivative or a combination of two or more thereof.

According to a preferred embodiment, the flavoured ingredient for forming a flavoured nugget is a coffee extract. This can be readily manufactured from a soluble coffee solution, and/or a roast and ground coffee extract. Alternative ingredients include, tea flavours, chocolate flavours, banana, strawberry or vanilla flavours and the like.

Preferably the edible components comprise a non-deformable part. The non-deformable part is preferably crunchy. Crunchy component may include materials of high fragmentability, including crushed nuts that offer a 'cracking' sensation during consumption or materials with a high brittleness that offer a crunchy mouthfeel. These components may sink in the final product. Other components include brittle starch-like matrices that may be aerated, offering a crunchy inclusion that has the ability to float on the final product.

Preferably the non-deformable part is formed from hard caramel, nut, crushed nut, hard candy, extruded chocolate, rice crispies, cereal, a biscuit piece, a peppercorn, crushed cinnamon stick or a spice, or a combination of two or more thereof. Grain pieces and fibre-based pieces are also contemplated.

As noted above, the components have difficulty in passing through small apertures in the cartridge. While one solution proposed by the present inventors is to provide generally a deformable component that retains its structure during deformation, an alternative is to provide a crunchy component that is coated with a deformable coating acting to protect the crunchy component from deformation.

A preferred embodiment is the use of a crunchy component coated with a chewy or deformable coating in a beverage. The technical advantage lies in the ability to provide enhanced mouthfeel, textural experiences and shelf life, as well as facilitating the act of dispensing the component from a suitable beverage cartridge.

A chewy exterior may be provided, made up of, for example, gel type materials (e.g. marshmallows) or fibre based materials that retain their structures during deformation (e.g. when dispensed through small apertures). They can be heat resilient which advantageously permits in-pack pasteurisation. Whilst the chewy exteriors retain their shape and consistency through beverage preparation, they act as a protective layer to keep the crunchiness of the other component throughout the shelf life. Finally, these component provide multiple sensorial experiences when the beverage is consumed due to their chewy textures outside and the crunchy/crispy textures inside.

The chewy coating may be used advantageously to change the density of the component. In this way, a dense chewy or crunchy ingredient may be made to be less dense than the aqueous medium by the provision of an outer layer of less dense chewy material. This could avoid the potentially undesirable situation whereby the insoluble components simply sink without trace within the beverage.

Preferably the edible components are provided with one or more coating layers. That is, the components used in the present invention may be single layered (a core with a single coating layer) or multi-layered ingredients for use in a beverage cartridge. As noted above, the coating layer or layers used in the components may act in one of a number of roles:

to provide a chewy or deformable coating on the outside of a non-chewy or deformable component;

to enhance storage stability of ingredients, for example by reducing moisture ingress or oxygen permeation;

to entrap specific flavour compounds resulting in their controlled release during the preparation of the beverage; and to provide temporal release of layers so that the beverage may be provided with a layered appearance.

The use of a multi-layered component allows the production of a product having a temporal release of layers to produce a layered beverage. In the prior art, these effects could be obtained through the use of separate components, for example, coffee grounds and creamer, in separate compartments of a beverage cartridge in order to provide a layered beverage. The use of the multi-layered component of the present invention avoids the need for a complex capsule design or a multiple capsule preparation.

The further layers may be provided to achieve any desirable texture or feature to the component. For example, the component may be provided with: chewy structures, crunchy structures, or structures that impart a specific functional quality to the final product such as turbidity, creaminess, layering, specific flavours or tastants. The component may contain specified tastants, for example, fruit acids, thereby offering the sensory impression of fruit pieces.

In one embodiment, the component may be provided with at least one coating layer that is water-insoluble, and/or an outermost layer that is insoluble in the aqueous beverage medium. Alternatively, the outer layer may not be soluble, but may be released on contact with the optionally cold/or hot aqueous medium. For example, a component may have a surface coat of emulsion droplets, which are released on preparation of the beverage and rise to the surface of the beverage. This may be used to provide a temporal effect, for example, if the droplets rise to the surface of the beverage following a short delay after dispensing the beverage.

The application of multilayer coatings may be used to enhance storage stability of the component e.g. by managing moisture ingress, managing oxygen permeation and managing the propagation of quality deteriorating chemical chain reactions (e.g. development of oxidative rancidity).

The water-insoluble layer may be formed from an alginate, preferably calcium alginate, or other coatings described herein. This is advantageous due to the ease at which a coating layer may be formed, by virtue of the method of the present invention, so that a conventional foodstuff may be readily transformed 3Q into a stable, substantially insoluble beverage additive. For example, the coating of an alginate, especially calcium alginate, can render a rice puff or rice crispie substantially water resistant and, to a desired extent, chewy.

The use of a water insoluble coating advantageously allows for the edible component to be stored within a liquid beverage composition within the cartridge before use in a beverage dispensing machine. With conventional additives, such as marshmallows, this would be inconceivable due to the decomposition and dissolution of the marshmallow over time. The provision of a water insoluble coating, particularly an alginate, facilitates this.

In an alternative embodiment, the outermost coating layer may be soluble in the aqueous medium (or "fluid"). Therefore, the component should not be stored in a aqueous environment unless it is only soluble in hot aqueous medium (e.g. 80° C.) and not under storage conditions (e.g. 20° C.). This allows for a beverage component to be added to the beverage on the outside of the component to be slowly released into the beverage. If the soluble coating is provided over an is insoluble coating then it is possible to provide, for example, a crunchy centred additive, with a chewy water soluble coating in a beverage, that slowly releases a soluble coating into the beverage to provide, for example, a surface colouring.

Preferably the edible components have a longest average diameter of from 0.25 to 10 mm. More preferably the longest average diameter is from 0.5 to 5, and most preferably from 1 to 3 mm. The longest average diameter may be measured by conventional techniques including random sampling, photographing and determining the longest observable diameters of the components.

The outlet of the beverage cartridge preferably has a shortest diameter of from 0.5 to 10 mm. More preferably the longest average diameter is from 1 to 7.5 mm, and most preferably from 2 to 5 mm. The outlet may have any cross-sectional shape, although rectangular, circular and oval are considered most suitable. In particular, circular outlets are preferred, in which case the diameter is a constant value. By outlet it is meant the narrowest part of the fluid pathway between the portion where the component is stored and the portion where the beverage enters the cup, mug or beverage container. The outlet may, therefore, form part of an eductor or a means for foaming as used in conventional cartridges. Alternatively, the cartridge may be designed so that the components can be dispensed by bypassing any foaming means.

Preferably the beverage cartridge of the present invention is a single use beverage cartridge. That is, the cartridge is inserted into a beverage preparation machine, a beverage is dispensed from the cartridge by the addition of an aqueous beverage medium and then the cartridge is disposed of. The cartridge is preferably sealed before use. That is, before the cartridge is placed into a machine it is sealed so that any beverage ingredients within (the discrete edible components and any beverage powder/agglomerate or liquid beverage ingredient) may not escape. If the material of the cartridge is substantially air impermeable then, in combination with the seal, this has the added advantage that the cartridge is not open to atmospheric contact which might degrade the ingredients within. Alternatively, during storage, the cartridge may be held within an external wrapper, perhaps under nitrogen, to reduce any degradation of the ingredients in the cartridge. When a beverage is prepared the seal is broken so that the aqueous medium can enter the cartridge and the beverage can be dispensed.

According to a second aspect the present invention provides a method of dispensing a beverage during an operating cycle from a cartridge according to the present invention as herein described, comprising the step of passing an aqueous medium through the cartridge to discharge the discrete edible components out of the outlet and into a receptacle.

The present inventors have also provided a discrete edible beverage component which is substantially insoluble in an aqueous beverage medium, the component comprising:
  (i) a chewy body, optionally having a crunchy core; or
  (ii) a crunchy body, optionally having a chewy core;
Preferably at least one further coating layer is provided thereon, wherein at least one of the further coating layers is substantially insoluble in water. Preferably the component comprises a restructured fruit piece, a soft candy, a fruit pastille or a flavoured nugget as described above, or hard caramel, nut, crushed nut, hard candy, extruded chocolate, rice crispies, cereal, a biscuit piece, a peppercorn, crushed cinnamon stick or a spice, or a combination of two or more thereof. The edible component preferably has a longest average diameter of from 0.25 to 10 mm.

The particular advantage of providing a coating layer is that the moisture and storage stability of the component may be greatly enhanced. Preferred coatings are formed by contacting a compound that forms a gel on contact with $Ca^{2+}$ ions with said ions. Preferably the compound is a polysaccharide. Preferred coatings include alginate gels, iota-carrageenan gel, low methoxy (LM) pectin and low acetyl (LA) gellan gum. The coating layer may allow for a temporally controlled dissolution of the component into the beverage. Furthermore, the presence of an outermost layer may allow for the above described temporal effects in a beverage while an inner water insoluble layer may protect the core.

In one embodiment the beverage component is a crunchy component, coated with a chewy layer, the component having a total density of less than 1 $g/cm^3$ so as to float on a beverage. Preferably the components used in the cartridges of the present invention have an in-beverage density of from 0.1 to 0.99 g/l. The density may be greater before contact with the aqueous medium so that the component can pass through the outlet and then expand further in the beverage.

In another embodiment the beverage component is a crunchy component, coated with a chewy layer, the component having a total density of equal to or more than 1 $g/cm^3$ so as to hang suspended within or sink within a beverage. Surface effects may also retain a slightly denser-than-water component on the surface of the beverage. Preferably the components used in the cartridges of the present invention have an in-beverage density of from 1.01 to 2 g/l. The density may be less before absorbing some of the aqueous medium.

In one embodiment the component is included in the beverage cartridge as a solid, optionally "crunchy" component. On the addition of the aqueous medium the component is at least partially hydrated by the aqueous medium so that the outermost surface becomes softer, preferably "chewy", to permit it to be discharged without damaged from the cartridge. Preferably the component may then become further hydrated in the bulk beverage so as to form a substantially chewy (optionally crunchy cored) and preferably expanded component. That is, preferably the component is selected so that the rate at which it absorbs the aqueous medium determines its structure as being "crunchy" or "chewy" in accordance with the definitions recited herein. As noted above, however, a non-hydratable component is preferred since this results in a more predictable and uniform beverage product.

According to a third aspect, the present invention provides a method for producing a discrete edible component for use in a beverage cartridge according to the present invention, the method comprising:

a) dissolving a flavoured ingredient in a coating solution; or
b) contacting at least an outer surface of a discrete edible component with
a coating solution to form a coated component;

and then contacting the coated component or aliquots of the dissolved flavoured ingredient with a solution comprising calcium ions, whereby the coating solution solidifies on contact with the calcium ions to a form the discrete edible component; and
transferring the discrete edible component into a beverage cartridge.

Solutions are known in the art, such as those in EP1326500, the contents of which are incorporated herein by reference, which solidify on contact with calcium ions and any such solution that is safe for consumption may be used as the coating solution in the method of the present invention. Preferably the coating solution comprises a dissolved polysaccharide in water. Preferred polysaccharides include alginates, carrageenans such as iota-carrageenan gel, low methoxy (LM) pectin and low aceyl (LA) gellan gum. Alginate is the most preferred. It is also possible to use potassium ion sensitive solutions, such as kappa carrageenan, in which case the coated component or aliquots of the dissolved flavoured ingredient must be contacted with a solution comprising potassium ions.

Preferably the method involves contacting aliquots of the dissolved flavoured ingredient with the solution comprising calcium ions by adding the dissolved flavoured ingredient drop-wise into the solution comprising calcium ions. This is advantageous since any flavoured composition may be prepared and converted into a chewy or deformable nugget for use as an edible component in a beverage cartridge.

Preferably the solution comprising calcium ions is a solution of calcium lactate, calcium gluconate or calcium chloride, or mixtures of two or more thereof. Calcium chloride is preferred as it is low cost, readily available and highly soluble (up to 750 g/l in pure water at 20° C. and 100 kPa). Other soluble calcium salts may be used. There is no particular limitation on the concentration of the ions in this solution, although, preferably the calcium ions are present in a concentration of from 0.1 to 100 g/l, more preferably 0.1 to 10 g/l more preferably from 0.5 to 5 g/l. The concentration is measured in the desired solvent, preferably water, at 20° C. and 100 kPa.

Advantageously, the method of the present invention permits the transfer and, optionally, the storage of the discrete edible component in a liquid solution. The coating prevents degradation of the component in the presence of moisture and allows the component to be stored in moist conditions, even in direct contact with a liquid beverage ingredient such as milk.

According to a fourth embodiment, there is provided a beverage accompaniment obtainable by the method described above. The beverage accompaniment is a discrete edible component.

According to a fifth aspect, the present invention provides the use of a coating according to the third aspect, preferably a calcium alginate coating, to allow a moisture sensitive discrete edible component to remain stable in an aqueous environment. That is, the moisture sensitive discrete edible component can be stored in an aqueous environment without decomposing or degrading. In this 1.0 way, the use of the coating allows the component to be held in an aqueous environment for at least one week, preferably 1 month and preferably at least a year and remain viable. That is, without losing its advantageous mouthfeel properties when dispensed into a beverage.

According to a sixth aspect there is provided a beverage dispensing system comprising a cartridge according to the present invention, and a beverage dispensing machine adapted to receive the cartridge and to dispense a beverage therefrom by the addition of an aqueous beverage medium.

It is noted that the cartridge of the present invention can also be used to prepare a food product. Such liquid food products are not strictly beverages but include, for example, soups, custards, sauces and the like. The ingredients to form these products may as is known conventionally be powdered, ground, leaf-based or liquid. The components which may be used to produce these non-beverage products may be produced in accordance with the present invention. Accordingly, a soup may be provided with croutons, for example, and hence a product may be produced which has an enhanced flavour, mouth feel, and enhanced organoleptic qualities.

BRIEF DESCRIPTION OF THE DRAWINGS

Non-limiting embodiments of the present invention will now be described, by way of example only, with reference to the accompanying drawings, in which.

DETAILED DESCRIPTION

The cartridge for use in the present invention encompasses any capsule, pod, container, or receptacle which contains one or more beverage ingredients in the manner described, having an inlet and a separate outlet formed in the cartridge. The cartridge may be rigid, semi-rigid or flexible. The substantially water impermeable materials that may be used are conventional and well known in the art.

Figure 1:
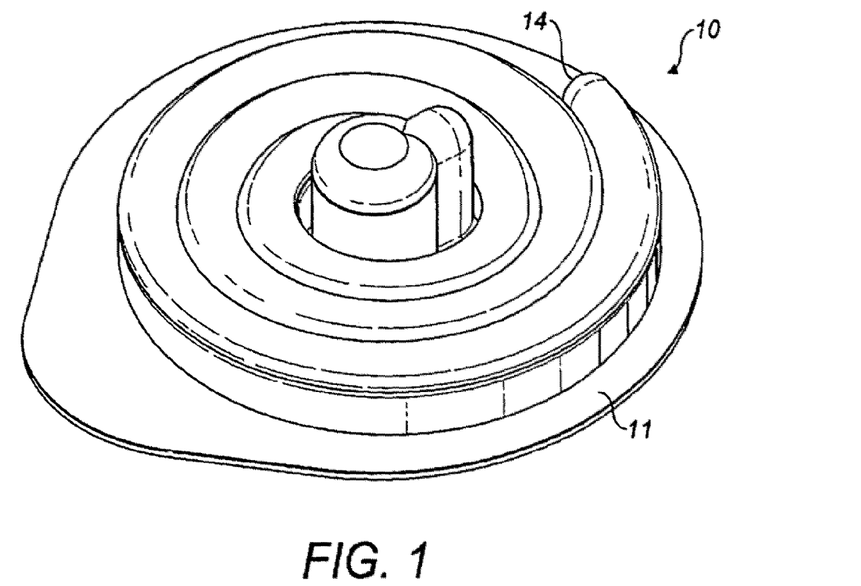
FIG. 1 is an isometric view of a cartridge for use in the present invention.
Figure 2:
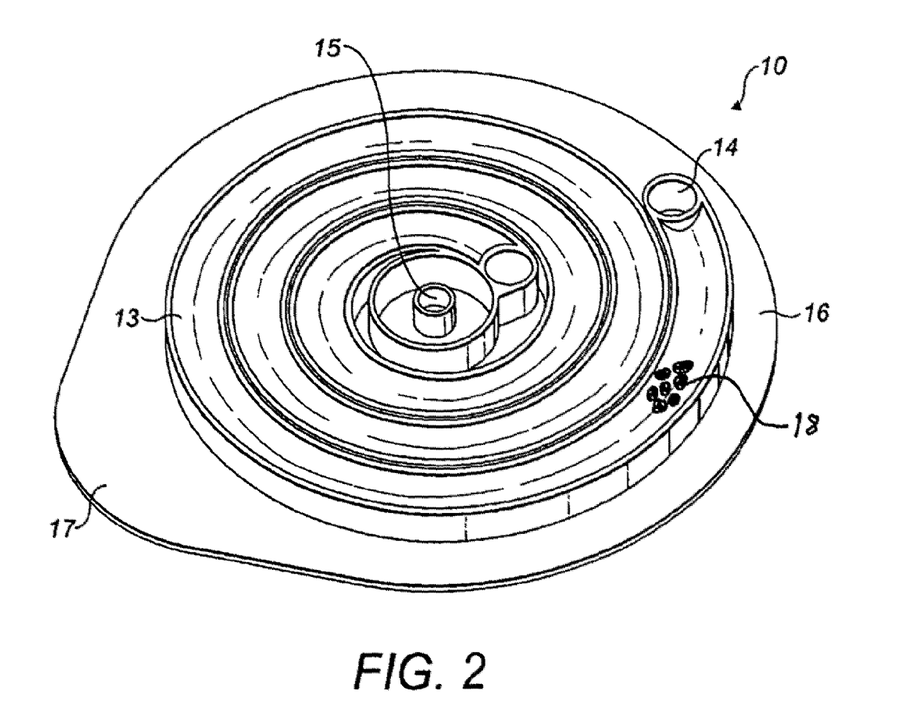
FIG. 2 is a similar view to that of FIG. 1, with a section of the outer casing of the cartridge removed.

By way of example, a first embodiment of a cartridge suitable for use in the present invention is illustrated in FIGS. 1 and 2. The cartridge 10 may be used in an automated brewing machine. The cartridge 10 generally comprises a casing 11 and sealing means. The casing 11 and sealing means are assembled to form the cartridge 10. The casing 11 at least partly defines an elongate tubular chamber 13 containing one or more beverage ingredients, only for which some are shown as feature 18 in FIG. 2. The density of packing of the beverage ingredients 18 in the chamber 13 can be varied as desired. The one or more beverage ingredients 18 include(s) one or more discrete edible components which are substantially insoluble in the aqueous medium used to make the beverage. The chamber 13 has a length to width ratio lying in the range of 1:4 to 1:200. The tubular chamber 13 does not need to be cylindrical in cross section as shown, but may have any desired cross sectional shape.

The chamber 13 has an inlet 14, an outlet 15 and provides a continuous elongate fluid flow path linking the inlet 14 to the outlet 15. The inlet 14 and outlet 15 are initially sealed by the sealing means and are opened, in use, by piercing, cutting or removing the sealing means. Other components may optionally be included in the cartridge 10.

The chamber 13 contains one or more one or more beverage ingredients 18 suitable for the formation of a beverage or liquid food product. The formation process may involve dissolution of the one or more ingredients by the liquid, admixing of the ingredient and the liquid, dilution, steeping, brewing or a combination of any of these processes when the liquid is introduced into the chamber 13.

As herein described the one or more beverage ingredients 18 include(s) one or more discrete edible components which are substantially insoluble in the liquid medium used to make the beverage.

The overall shape of the cartridge 10 illustrated is generally circular or disc-shaped with the diameter of the cartridge 10 being significantly greater than its height. This dimension is limited by the machine in which the cartridge 10 is intended to be used. Typically the overall diameter of the cartridge 10 is 74.5 mm±6 mm and the overall height is 16 mm±3 mm.

The cartridge 10 is provided with an outwardly extending flange 16. Typically the flange 16 has a width of between 2 and 4 mm. A portion of the flange 16 is enlarged to form a handle 17 by which the cartridge 10 may be held. The flange 16 and handle 17 are generally used to locate the cartridge correctly in the brewing machine.

The casing 11 is preferably formed as two separate mouldings from high density polyethylene, polypropylene, polystyrene, polyester, or a laminate of two or more of these materials, A suitable polypropylene is the range of polymers available from DSM UK Limited (Redditch, United Kingdom). The casing 11 is preferably made using injection moulding and the sections of the casing are joined in a suitable manner, for example by ultrasonic or heat welding.

Alternatively, the casing 11 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minnesota, USA), starch-based polymers, cellulose derivatives and polypeptides.

In use, when the inlet 14 and outlet 15 have been opened by the action of the machine piercing the sealing means, the liquid (eg an aqueous medium), under pressure, enters the cartridge 10 and flows into the chamber 13 through the inlet 14. The liquid flows through the chamber 13 in contact with the ingredients 18 contained therein. The beverage or food product formed by passage of the liquid through the chamber 13 passes to the outlet 15 where the product is directed by the machine for discharge into a receptacle such as a cup or bowl.

The tubular chamber 13 of the cartridge 10 of the present invention has a greatly extended internal length to width ratio when compared to those in prior art cartridges and this provides a number of significant advantages in the ability to manage the liquid used to prepare the beverage or food product and thereby modify the characteristics of the prepared product. One way of achieving this is by forming the chamber 13 as a spiral tube which starts at the inlet 14 and spirals inwardly to the outlet 15 (as shown in FIGS. 1 and 2). This is particularly suitable for the disc-type cartridge 10 illustrated in FIGS. 1 and 2.

The preferred internal diameter of the chamber 13 lies in the range of 1 to 20 mm, more preferably 1 to 10 mm and most preferably 5 to 8 mm. The preferred internal length of the chamber 13 lies in the range of 50 to 1000 mm.

One of the advantages of using an elongate chamber 13 is that the preparation time, i.e. the amount of time taken for the liquid (water or another fluid) to pass through the chamber 13 is significantly extended. Furthermore there is a very high surface area:volume ratio which can be used in a number of beneficial ways. For example it enables powders and thick liquids to be flushed out, thus allowing more solids to be incorporated in the beverage or food product. This reduces the residue left in the chamber 13.

Figure 3:
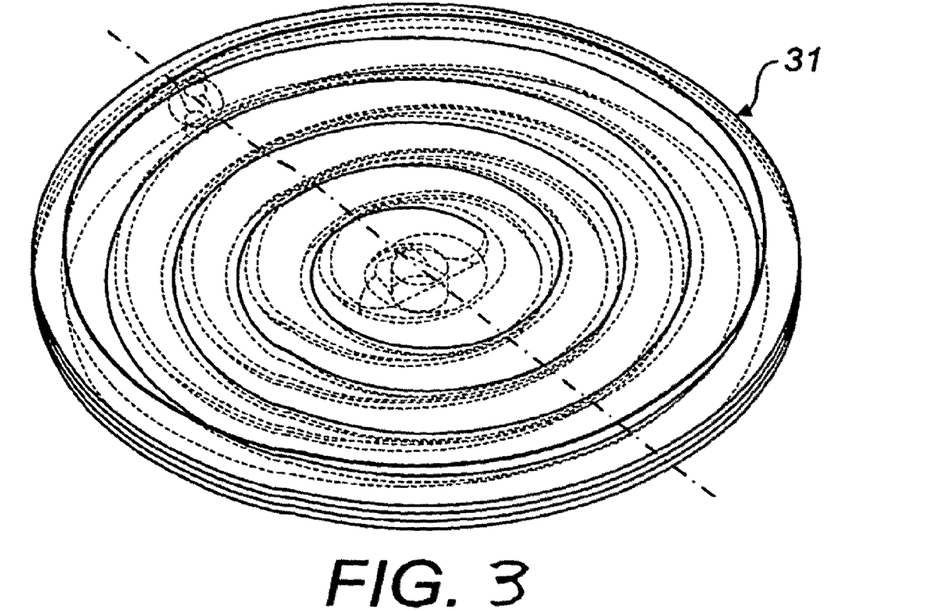
FIG. 3 is an isometric view of upper and lower sections of the casing of another embodiment of a cartridge for use in the present invention.
Figure 3A:
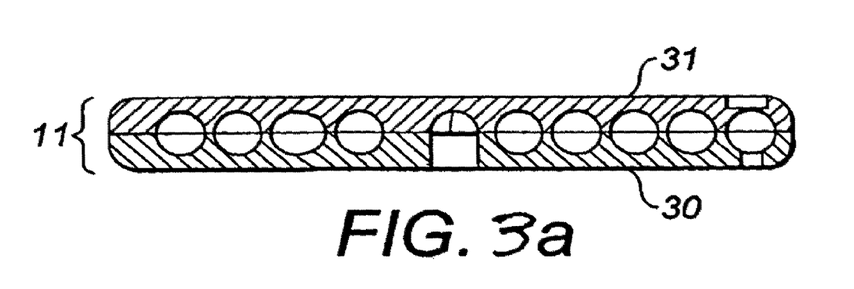
FIG. 3a is a cross section side elevation of the casing formed from the upper and lower sections shown in FIG. 3 at different orientations.

In another embodiment of the cartridge shown in FIGS. 3 and 3a, the casing 11 has top and bottom sections 30, 31 each of which has a section of the chamber 13 in the form of a spiral, but with the spirals in opposing directions. In FIGS. 3 and 3a the spirals line up. The aqueous medium is fed in at the inlet and feeds around the opposing spiral track. The flow is split between the upper and lower spiral and travels in opposing directions. This creates turbulence, resulting in stirring/mixing of the product.

The invention will now be further rated in the following non-limiting examples.

EXAMPLES

The following working examples demonstrate the benefits of this invention in a liquid on-demand beverage. Firstly, beverage ingredients were made according to the method of the present invention. Secondly, a beverage was produced by diluting a liquid concentrate (e.g. flavoured or unflavoured chocolate syrup or caramel, hazelnut etc., syrup) and the chewy beverage ingredients with ho old (88-90° C./25° C.) water.

The following solutions were prepared for use in the Examples:

Solution 1:

1 g of Alginate was dry mixed with 5 g of sugar to help dispersability. A water soluble yellow food colouring at a level of 0.01 g and the above dry mix was added slowly to 100 g of water at ambient temperature (~20° C.) whilst stirring rigorously using a magnetic stirrer. Once all the dry ingredients hydrated and dissolved, a perfectly clear yellow coloured alginate solution was obtained.

Solution 2:

2 g of $CaCl_2$ was added to 100 g of water at ambient temperature (~20° C.) Once the $CaCl_2$ was hydrated and dissolved, a perfectly clear solution was obtained.

Solution 3:

1 g of $CaCl_2$ was added to 100 g of semi-skimmed milk whilst stirring rigorously using a magnetic stirrer.

Solution 4:

1 g of Ca-lactate was added to 100 g of whole milk, whilst stirring rigorously using a magnetic stirrer.

1) Preparation of Chewy Components

Example 1

Approximately 1-2 ml of solution 1 above was dropped into Solution 2 using a pipette with a small orifice (ranging from 0.1-5 mm) and small, perfectly round coloured yellow spheres were formed. These spheres were then removed and washed with hot water at around 85° C. These spheres were kept in this liquid solution without losing their shape or size for 12 months at ambient conditions.

Example 2

10 g of spray dried soluble coffee was reconstituted in the solution 1 described above and 1-2 ml of this solution was dropped using a pipette with a small orifice (ranging from 0.1-5 mm) into solution 2. Small, perfectly formed coffee spheres were formed. These spheres were then removed using a strainer and washed with hot water at around 85° C. They were kept in this liquid solution without losing their shape or size for 12 months at ambient conditions.

Example 3

10 g of spray dried soluble coffee was reconstituted in the solution 1 described above and 1-2 ml of this solution was dropped into solution 3 described above using a pipette. Small, perfectly round pale coloured spheres were formed. These spheres were then removed using a strainer and washed with hot water around 85° C. They were kept in this liquid solution without losing their shape or size for 12 months at ambient conditions.

Chewy components made as above were placed in caramel syrup and kept in water bath at 85° C. for 15 minutes and cooled immediately to check the heat stability. At the end of the heat treatment component were still intact, keeping their original shape and still separate from the caramel syrup.

2) Preparation of Chewy Components with Crunchy Interior

Example 4

Rice crispy pieces lightly coated with cocoa powder were placed into solution 1 above and kept for 1 minute. They were then removed and placed in solution 4 above. A chewy casing made with Ca-alginate was immediately formed. These pieces were removed using a strainer and washed in 85° C. hot water immediately.

Components made as described in Example 4 were placed in hot water and kept in water bath at 85° C. for 15 minutes and cooled immediately to check their heat stability. At the end of the heat treatment components were still intact with their original cocoa powder coating and did not show any sign of absorbing water (going soggy) or disintegrating. There was no discolouration in water immediately after heat treatment.

3) Benefits of Invention Through Sensory Tests

Figure 4:
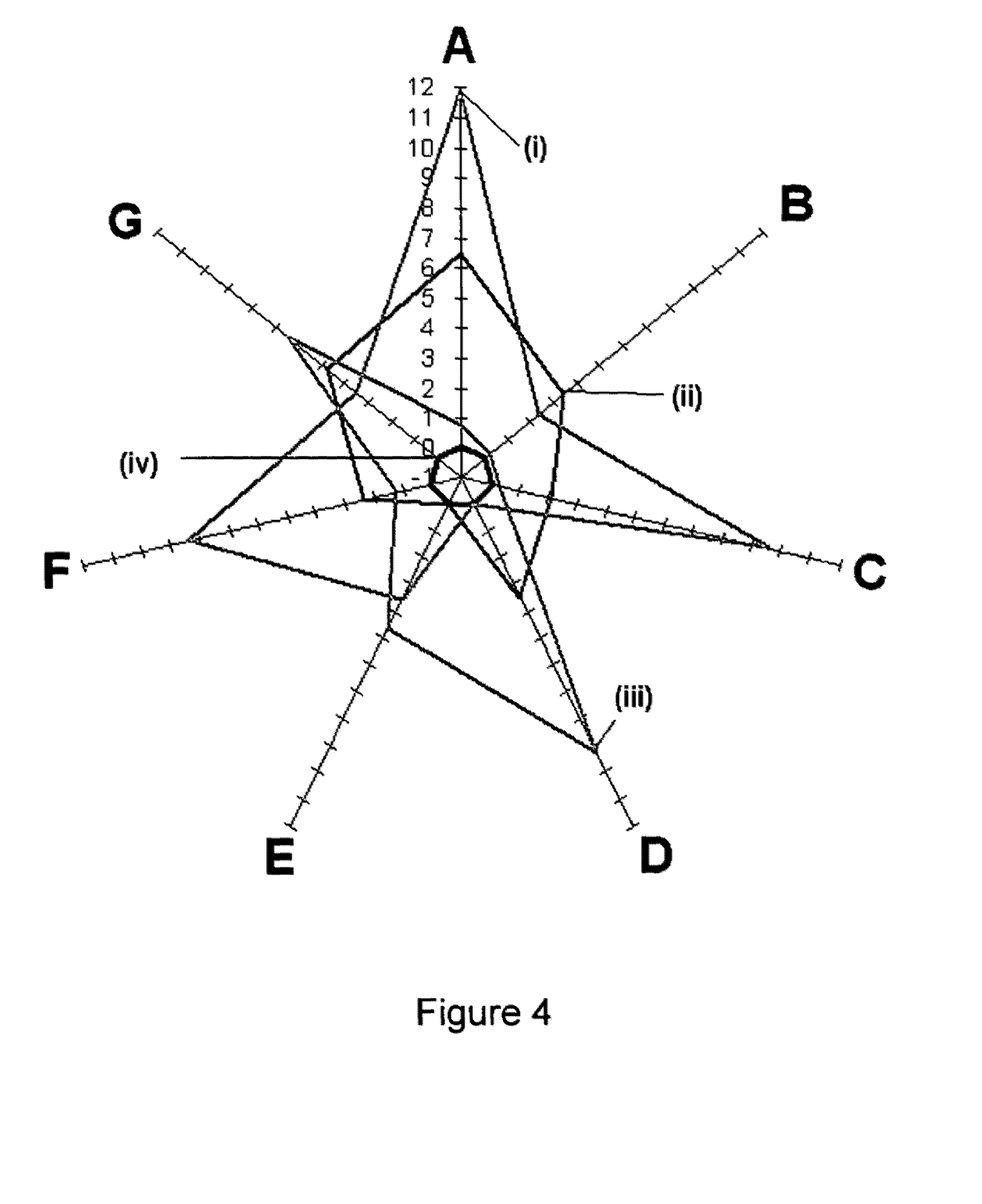
FIG. 4 shows a graph of the mouthfeel attributes that differentiate the sample cappuccino beverages with different components.
Figure 5:
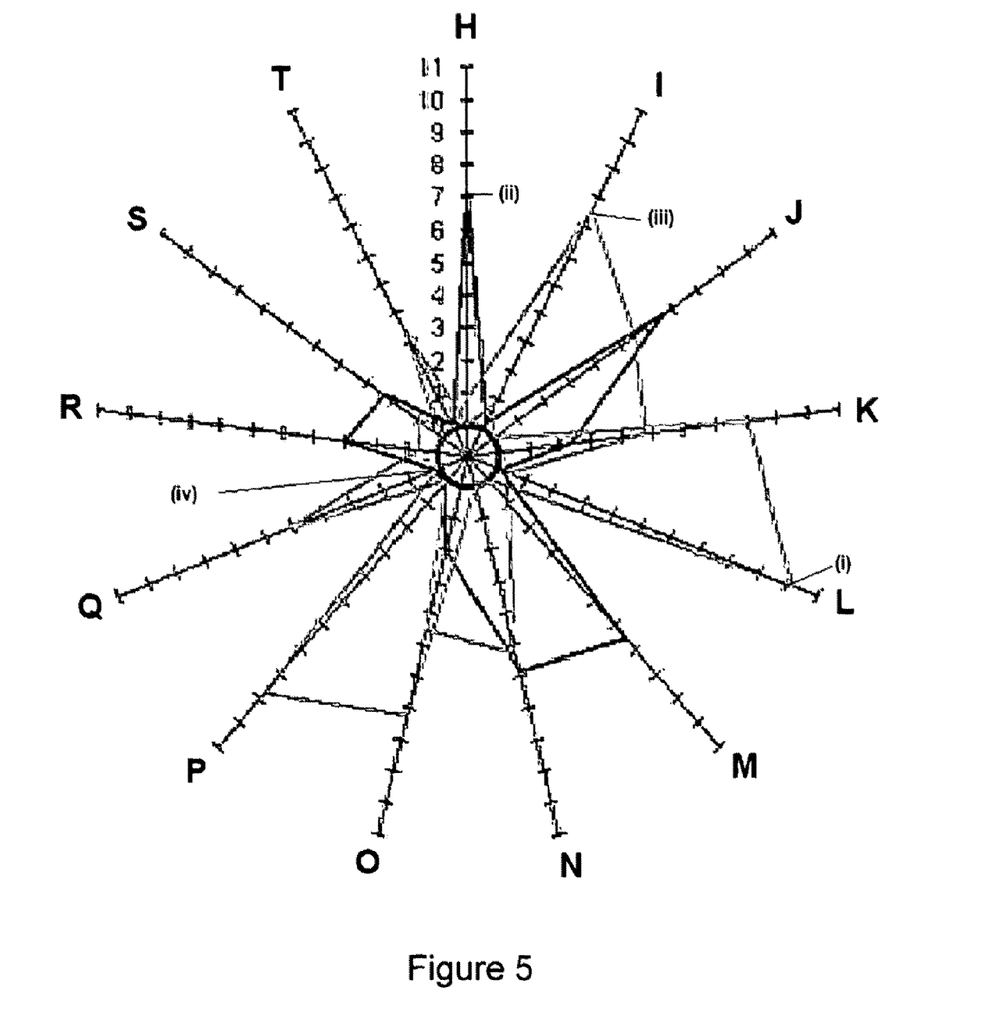
FIG. 5 shows a graph of the overall differentiating attributes within the sample cappuccino beverages that includes different types of components.

A sensory test was conducted with Kraft internal expert sensory panel. Up to 10 panellists participated in this test where the following components were placed in a standard Tassimo Carte Noire cappuccino base.
Component (i): Spherical toffee/caramel pieces coated with milk chocolate mass;
Component (ii): Spherical rice crispy pieces lightly coated with cocoa powder;
Component (iii): Spherical rice crispy pieces coated with dark chocolate mass.
Comparative (iv): no added components The results are shown in FIGS. 4 and 5. The following key explains the letter codes used in these figures:
A: Chewy (1-12)
B: Soft/soggy (1-12)
C: Sticky/tacky (1-12)
D: Crunchy (1-12)
E: Smooth (1-12)
F: Tacky afterfeel (1-12)
G: Dry afterfeel (1-12)
H*: Stale (1-11)
I*: Cocoa (1-11)
J*: Cereal/grainy (1-11)
K*: Sweet (1-11)
L*: Toffee/caramel (1-11)
M*: Stale after-taste (1-11)
N*: Cereal after-taste (1-11)
O*: Sweet after-taste (1-11)
P*: Caramel/toffee after-taste (1-11)
Q*: Cocoa after-taste (1-11)
R**: Stale after-taste (1-11)
S**: Cereal/grainy after-taste (1-11)
T**: Caramel/toffee after-taste (1-11)
*Attribute related to the component.
*Attribute related to the liquid part The results showed that:
Components added two different dimensions, namely mouthfeel and flavour, to the overall beverage.
All components were differentiated clearly from each other within the context of a cappuccino base.
Cappuccino with component (ii) was perceived to have stale and cereal/grainy overall flavour and aftertaste. They were also perceived to be soggy/soft. They had negative reactions from the panellists.
Cappuccino with component (iii) was differentiated by smooth, crunchy and aerated mouthfeel dimensions. Dark chocolate coating boosted the cocoa flavour dimension in overall liquid flavour. Smooth exterior followed by a crunchy interior was perceived as surprising and positive.
Cappuccino with component (i) was differentiated by sweet, toffee/caramel taste and aftertaste. Also it had sticky/tacky and dense mouthfeel.

Comparative Examples

Approximately 2 g of small sphere rice crispy pieces, lightly coated with cocoa powder, were placed in around 7 g of UF milk, 15 g of caramel syrup and around 7 g of hot water separately in small glass vials and heat treated at 85° C. for 15 minutes to test their heat stability. At the end of the heat treatment the following was observed:
Rice crispy pieces in caramel syrup, kept most of heir shape, but lost heir outer cocoa coating.
Rice crispy pieces in milk mostly disintegrated, stuck together and lost their outer coating, making the milk slightly chocolaty in colour. On squeezing between two fingers, these pieces were soft and soggy and very quickly turned into a soft paste.
Rice crispy pieces in water completely lost their shape and coating and the water turned into a chocolate coloured biscuity liquid.

The present invention provides for discrete edible components to provide a further dimension of mouthfeel, with the convenience of a beverage dispensing cartridge. The components may be tailored to be specifically suitable for dispensing from a cartridge. In addition, the components may be tailored to be specifically suitable for storage in a cartridge to provide a long shelf life. Advantageously, the components may be stored in an aqueous environment because they are substantially insoluble. The use of aqueous environments allows the use of aqueous beverage components, such as liquid milk, cream or liquid chocolate, which have known advantages such as improved foaming (over dry components), faster dispensing, improved mixing and no residues or lost ingredients retained in the cartridge.

Although preferred embodiments of the invention have been described herein in detail, it will be understood by those skilled in the art that variations may be made thereto without departing from the scope of the invention or of the appended claims.

The invention claimed is:

1. A method of dispensing a beverage with a beverage preparation machine during an operating cycle from a cartridge,
   wherein the cartridge is formed from substantially water-impermeable materials and comprises an inlet for the introduction of an aqueous medium into the cartridge and an outlet for discharge of a beverage produced from the aqueous medium and one or more beverage ingredients contained in the cartridge,
   wherein the one or more beverage ingredients includes one or more discrete edible components having a longest average diameter of from 0.25 to 10 mm which are substantially insoluble in the aqueous medium,
   the method comprising the steps of passing the aqueous medium through the cartridge to dispense the discrete edible components out of the outlet and into a receptacle.

2. A beverage cartridge for use in a beverage preparation machine in the method of claim 1, wherein the cartridge is formed from substantially water impermeable materials and comprises an inlet for the introduction of an aqueous medium into the cartridge and an outlet for discharge of a beverage produced from the aqueous medium and one or more beverage ingredients contained in the cartridge,
   wherein the one or more beverage ingredients includes one or more discrete edible components having a longest average diameter of from 0.25 to 10 mm which are substantially insoluble in the aqueous medium.

3. A beverage cartridge according to claim 2, wherein the edible components are deformable.

4. A beverage cartridge according to claim 2, wherein the edible components comprise a restructured fruit piece, a soft candy, a fruit pastille or a flavoured nugget.

5. A beverage cartridge according to claim 4, wherein the flavoured nugget comprise a hydrocolloid and a flavoured ingredient, wherein the hydrocolloid is selected from gelatine, carrageenan, alginate, agarose, gellan gum, pectin, a cellulose derivative or a combination of two or more thereof.

6. A beverage cartridge according to claim 2, wherein the edible components comprise a non-deformable part which is formed from hard caramel, nut, crushed nut, hard candy, extruded chocolate, rice puffs, cereal, a biscuit piece, a peppercorn, crushed cinnamon stick or a spice, or a combination of two or more thereof.

7. A beverage cartridge according to claim 2, wherein the edible components are provided with one or more coating layers.

8. A beverage cartridge according to claim 7, wherein at least one coating layer is water-insoluble.

9. A beverage cartridge according to claim 8, wherein the water-insoluble layer is formed from an alginate.

10. A beverage cartridge according to claim 9, wherein the edible components are stored within a liquid beverage composition within the cartridge before use in a beverage dispensing machine.

11. A beverage cartridge according to claim 10, wherein at least the outermost coating layer is soluble in the fluid.

12. A method for producing a discrete edible component for use in a beverage cartridge according to claim 2, the method comprising;
   a) dissolving a flavoured ingredient in a coating solution; or
   b) contacting at least an outer surface of discrete edible component with a coating solution to form a coated component;
   and then contacting aliquots of the dissolved flavoured ingredient or the coated component with a solution comprising calcium ions, whereby the coating solution solidifies on contact with the calcium ions to a form the discrete edible component; and
   transferring the discrete edible component into a beverage cartridge according to claim 2.

13. A method according to claim 12, wherein the method further comprises rinsing the discrete edible component.

14. A method according to claim 12, wherein the discrete edible component is transferred into an aqueous solution within the beverage cartridge.

* * * * *